United States Patent
Stockel

[15] 3,695,515
[45] Oct. 3, 1972

[54] FLUID COOLED THRUST NOZZLE FOR A ROCKET

[72] Inventor: Karl Stockel, Ranhazweg 21, 8012 Ottobrunn, Germany

[22] Filed: April 21, 1970

[21] Appl. No.: 48,703

Related U.S. Application Data

[62] Division of Ser. No. 743,473, July 9, 1968, Pat. No. 3,605,412.

[30] Foreign Application Priority Data

July 19, 1967 Germany..........P 16 26 063.2

[52] U.S. Cl. .......239/127.1, 239/127.3, 239/265.17, 60/260
[51] Int. Cl. .............................................B64d 33/04
[58] Field of Search...........239/127.1, 127.3, 265.17; 60/39.66, 260, 590.5

[56] References Cited

UNITED STATES PATENTS

| | | | |
|---|---|---|---|
| 3,086,358 | 4/1963 | Tumavicus............ | 60/39.66 X |
| 2,977,754 | 4/1961 | Bell........................... | 60/260 |
| 3,423,029 | 1/1969 | Demaison........... | 239/590.5 X |
| 3,004,386 | 10/1961 | Ledwith................ | 60/39.66 X |

Primary Examiner—M. Henson Wood, Jr.
Assistant Examiner—Edwin D. Grant
Attorney—McGlew and Toren

[57] ABSTRACT

A fluid cooled combustion chamber for a rocket engine is composed of walls forming a longitudinally extending convergent-divergent thrust nozzle having a neck portion at its narrowest section. A radially inner row and a radially outer row of cooling ducts encircle the interior surface of the thrust nozzle at its neck portion with the ducts extending longitudinally into the convergent and divergent portions. The outlet end of the inner row of cooling ducts may be arranged to direct coolant fluid into the thrust nozzle with means providing a twist to the fluid as it enters the nozzle.

5 Claims, 6 Drawing Figures

PATENTED OCT 3 1972  3,695,515

FLUID COOLED THRUST NOZZLE FOR A ROCKET

This is a division of application Ser. No. 743,473 filed July 9, 1968 now U.S. Pat. No. 3,605,412.

SUMMARY OF THE INVENTION

The present invention is directed to a fluid cooled combustion chamber and thrust nozzle for a rocket, and more particularly, it concerns a convergent-divergent thrust nozzle with coolant ducts or tubes forming the interior surface of the combustion chamber and thrust nozzle walls.

Various forms of fluid cooled combustion chambers with thrust nozzles have been known in the rocket engine art. One cooling system which has been used for such combustion chambers and thrust nozzles comprises introducing liquid oxygen or hydrogen through an inlet ring into coolant ducts extending longitudinally through the wall surfaces of the thrust nozzle and a combustion chamber wherein the liquid propellant component absorbs heat in the course of its flow passage and then is injected into the combustion chamber from the outlet ends of the coolant ducts.

In French Pat. No. 1,108,090, the neck of a thrust nozzle is shown formed by a torus member which is traversed by one of the liquid fuel components of the rocket. As the fuel component flows through the torus the neck of the thrust nozzle is cooled and at the same time the component is heated prior to its introduction into the combustion chamber whereby the efficiency of the combustion process is improved. One of the embodiments disclosed in this patent provides injection bores in the torus directed into the convergent part of the thrust nozzle for introducing the coolant fluid into the thrust nozzle in counter-flowing relationship with the fluid passing therethrough.

As is well known, gas generators, that is combustion chambers, have regions which are exposed to high thermal stresses. In the combustion chambers of rockets having convergent-divergent thrust nozzles the neck portion of the nozzle is exposed to the maximum thermal stress conditions. Moreover, the end of a pre-combustion chamber tapered toward the inlet end of the combustion chamber represents a highly thermally stressed region in the main flow path of a rocket engine.

Accordingly, it is the primary object of the present invention to provide effective cooling means for the neck portion of a convergent-divergent thrust nozzle in a rocket engine.

Another object of the invention is to afford effective cooling by means of a first row of coolant ducts forming the inner surface of the neck of the thrust nozzle with a second row of ducts concentrically disposed about the first row. Further, it is intended to regulate the quantity of flow through the second row of coolant ducts for increasing the flow through the first row of ducts.

Still, another object of the invention is to locate outlets from the first row of coolant ducts for introducing the coolant fluid directly into the thrust nozzle. In this arrangement blade means are provided at the outlets from the first row of coolant ducts to provide a twisting action to the coolant fluid for flow along the wall surface within the thrust nozzle.

Yet another object of the invention is to employ a separate source of pressurized fluid acting on piston means which are also in communication with the flow of coolant fluid through the walls of the combustion chamber for regulating the flow of coolant fluid through the first and second rows of coolant ducts in relationship to the temperature and pressure conditions existing within the thrust nozzle.

A further object of the invention is to provide flange means for connecting separable divergent and convergent portions of the thrust nozzle together with the neck portion disposed between these portions, and sealing means for preventing leakage from the joints between the rows of coolant ducts and the passageways for the coolant fluid along the interior surfaces of the convergent and divergent portions of the thrust nozzle.

Still another object of the invention is to provide a source of coolant fluid for the first row of coolant ducts different from the coolant fluid which flows through the tubes forming the inner surface of the convergent and divergent portions of the thrust nozzle.

The problem of adequately cooling the neck portion of the thrust nozzle is achieved in the present invention by providing two rows of longitudinally extending ducts forming the interior surface of the neck portion of the thrust nozzle, one row forms the inner surface of the neck and the adjacent portions of the convergent and divergent portions of the thrust nozzle while the other row is located radially outwardly from and concentrically about the inner row.

By dividing the total flow of the coolant fluid into at least two rows of coolant ducts an increase in heat exchange surface is afforded between the liquid coolant and the adjacent regions of the thrust nozzle, and, in addition, the strength of the wall of the thrust nozzle at its neck is increased as compared to where a single row of coolant ducts is used having a relatively larger cross section. Moreover, by employing two separate rows of ducts it is possible to vary the cooling effect on the thrust nozzle and the combustion chamber and also to regulate the end temperature of the cooling fluid. In addition, due to the reduction in the cross section of the individual section of the individual coolant ducts, a more intensive and rapid "expulsion" of vapor bubbles is possible, particularly in the row of ducts along the inner surface of the neck of the thrust nozzle. As a result of this more rapid removal or expulsion of the vapor bubbles the likelihood that local overheating may develop is much less as compared to the situation where a single row of larger coolant ducts are utilized.

In one embodiment of the invention the coolant ducts forming the inner surface of the thrust nozzle neck are open at their outlet ends for admitting the coolant fluid into the thrust nozzle whereby the coolant fluid forms a layer of mist along the inside wall of the thrust nozzle. Moreover, it is possible to connect the coolant ducts located along the inner surface of the thrust nozzle to a source of coolant fluid different from the one flowing through the tubes in the walls of the combustion chamber and in the convergent and divergent portions of the thrust nozzle. This separate source of coolant fluid is of particular advantage where it is intended to employ the coolant fluid for mist cooling on the interior surface of the thrust nozzle.

Another feature of the invention is the ability to regulate the cross section of the coolant ducts in one of the rows. By varying the cross section, the flow of the coolant fluid through the ducts in the different rows can be varied, such an arrangement is especially useful in cooling the highly heated regions of the combustion chamber and its thrust nozzle for effectively removing heat and at the same time determining the end temperature of the coolant fluid as it is discharged from the cooling ducts.

To facilitate the construction of the thrust nozzle the rows of coolant ducts forming the neck portion of the nozzle can be formed as a separate unit and secured in place between the convergent and divergent portions. In this arrangement it is relatively simple to replace the neck portion of the thrust nozzle which is subjected to the greatest wear and thereby achieve the maximum utilization from the different parts of the combustion chamber thrust nozzle unit.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
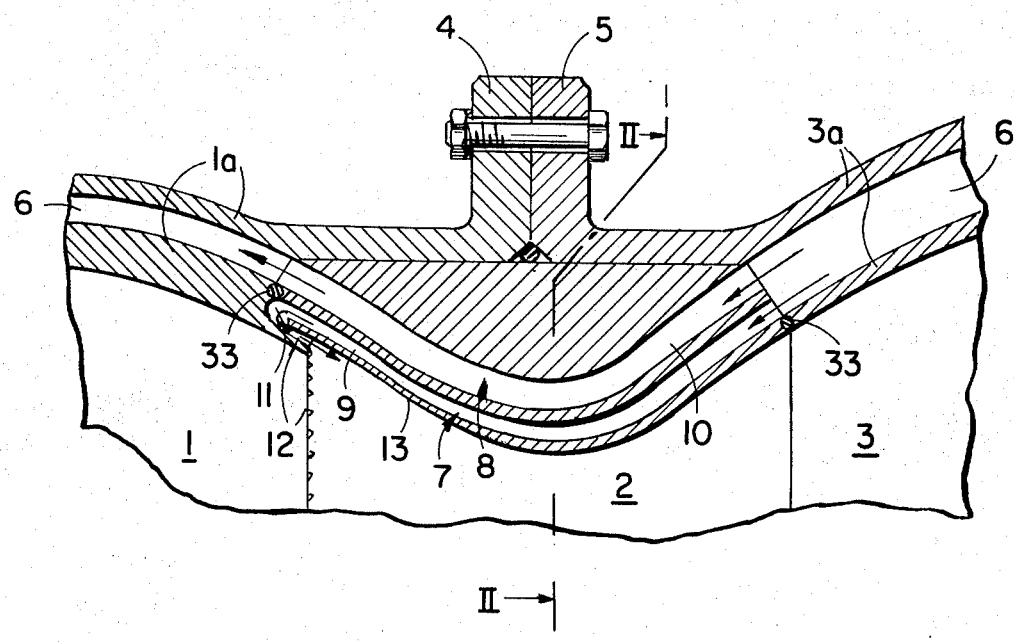
FIG. 1 is a partial longitudinal section of a thrust nozzle illustrating one embodiment of the present invention.

In the various Figures in the drawing similar parts have been given the same reference numerals.

In the drawing the three different embodiments of a thrust nozzle are connected in series with a rocket combustion chamber and are formed of a convergent portion 1, a neck portion 2, and a divergent portion 3 of a thrust nozzle. The convergent and divergent portions 1, 3 are detachably connected together by means of the flanges 4 and 5 and the neck portion 2 is removably positioned between the walls 1a and 3a of the convergent and divergent portions. Extending through each of the walls 1a and 3a is a single circumferentially extending row of coolant ducts 6 while in the neck portion 2 of the thrust nozzle two rows 7 and 8 of coolant ducts 9 and 10 are provided. The radially inner row 7 forms the interior surface of the neck portion and extends from the smallest diameter part of the thrust nozzle in diverging relationship toward the convergent and divergent portions of the thrust nozzle.

Figure 2:
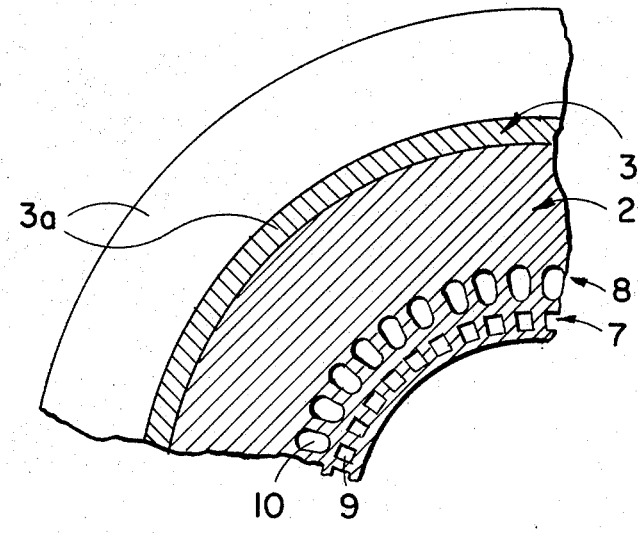
FIG. 2 is a transverse sectional view taken along line II—II of FIG. 1.

The radially outer row 8 of the coolant ducts 10 is disposed concentrically about the inner row 7 and as shown in FIGS. 1 and 2 the ducts 10 have a larger cross sectional area than the ducts 9.

In FIG. 1 the direction of flow of coolant fluid through the ducts 6 in the divergent and convergent portions of the thrust nozzle and through the neck portion are shown by arrows. The inlet ends of the ducts 9 and 10 are provided adjacent the divergent portion of the thrust nozzle while the outlet ends of the ducts 9 and 10 are located adjacent the convergent portion of the thrust nozzle. The flow through the outer row of ducts 10 is continuous from the ducts 6 within the divergent portion into the ducts 6 in the convergent portion. However, the flow from the ducts 6 into the coolant ducts 9 in the inner row within the neck portion terminates at the wall 1a of the convergent section and makes a reverse bend and is directed inwardly into the thrust nozzle along the inner surface of the ducts 9. Blades 12 are provided at the outlets from the ducts 9 into the thrust nozzle whereby the coolant fluid is given a twisting action as it continues its flow passing from the convergent toward the divergent portions of the thrust nozzle. Due to the manner in which the coolant fluid is directed into the thrust nozzle it flows along the inside surface 13 of the neck portion 2 forming a film or layer of mist which protects this surface, and the flow is stabilized in this region by the inherent centrifugal force imparted to the fluid as it flows from the outlets of the ducts 9.

Figure 3:
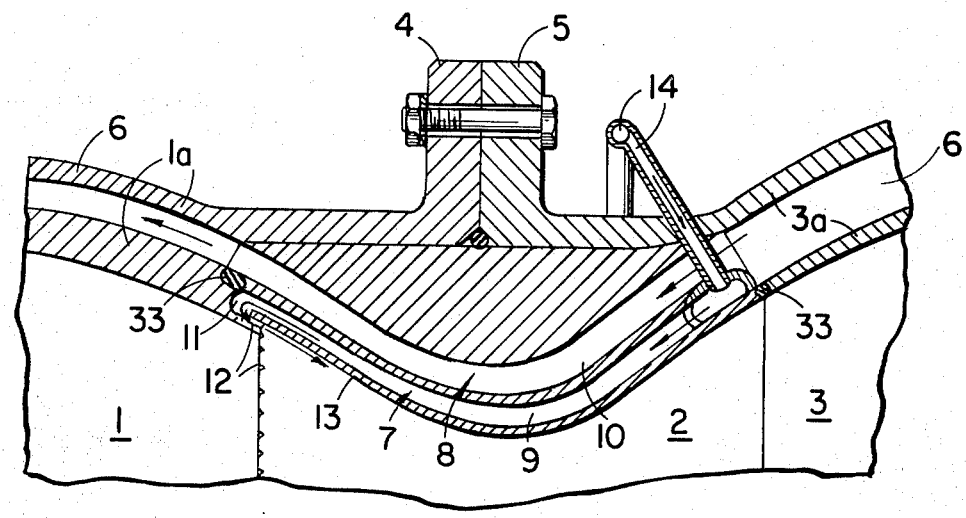
FIG. 3 is a partial transverse sectional view of a thrust nozzle showing another embodiment of the present invention.

In the embodiment shown in FIG. 3 the arrangement is similar to that shown in FIG. 1, however, the coolant fluid is supplied to the coolant ducts in the inner row 7 from a separate cooling circuit having a connecting conduit 14 which extends inwardly into the ducts 9. In this arrangement the fluid flowing through the ducts 6 in the divergent portion 3 continues its serial flow path through the ducts 10 in the outer row 8 and then into the ducts 6 in the convergent portion 1. The separate flow of coolant fluid from the connecting conduit 14, flows for the length of the ducts 9 and passes through the outlets 11 being directed into the thrust nozzle for flow along the inside surface 13 of the thrust nozzle neck portion 2.

Figure 4:
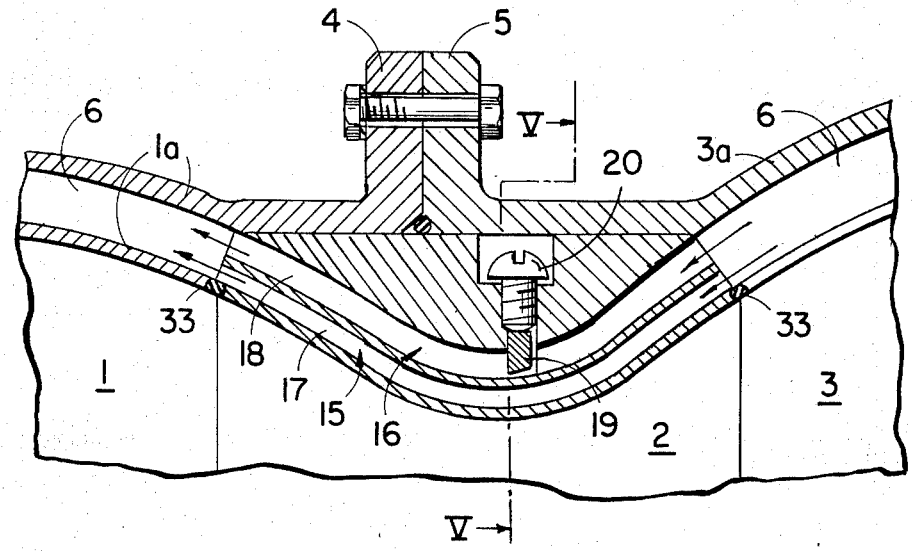
FIG. 4 is a partial longitudinal sectional view of a thrust nozzle showing still another further embodiment of the present invention.
Figure 5:
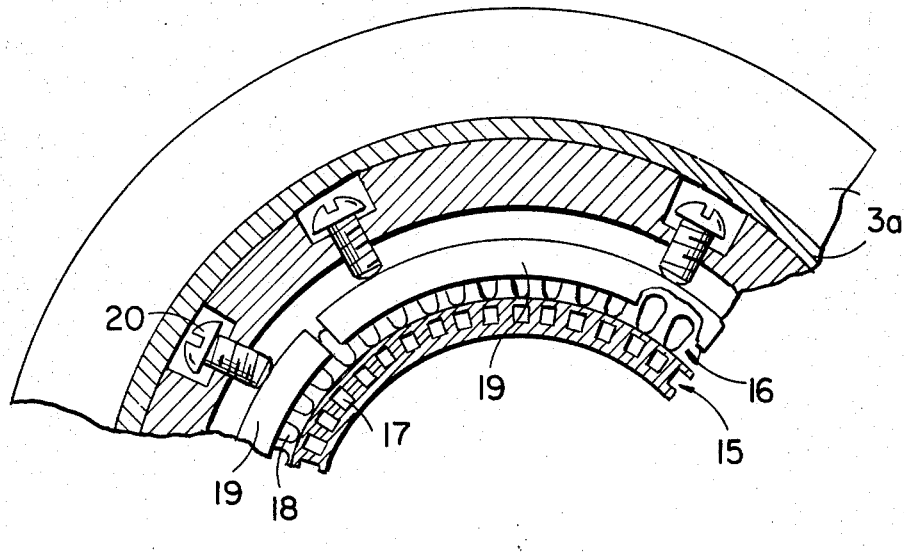
FIG. 5 is a transverse sectional view taken along line V—V in FIG. 4.

In the embodiment shown in FIGS. 4 and 5 an inner row 15 of coolant ducts 17 and an outer row 16 of coolant ducts 18 are connected at their inlet and outlet ends to the ducts 6 extending along the interior surfaces of the divergent and convergent portions of the thrust nozzle. In both the inner and outer rows of coolant ducts 17 and 18 the coolant flows in a continuous closed passageway between the ducts 6 located on either side of the neck portion 2 and the coolant does not flow into the thrust nozzle after its passage through the neck portion 2. As is shown in FIG. 4 a common source of coolant fluid is provided to the ducts 17 and 18 at the outlet from the ducts 6 in the divergent portion 3 of the thrust nozzle. After its passage through the ducts 17 and 18 the flow is again combined within the duct 6 in the convergent portion 1 of the thrust nozzle. However, the flow through the outer coolant ducts 18 can be regulated by means of individual locking ring sections 19 which extend circumferentially about the neck portion 2 and are movably positionable within the coolant flow paths through the ducts 18. As displayed in FIG. 5 the locking ring sections 19 are spaced in the circumferential direction to permit their movement radially inwardly and outwardly for adjustably controlling the flow through the ducts 18. Screws 20 are provided within the outer walls of the neck portion for selectively positioning the locking ring sections 19 to effect regulation of coolant flow. As the coolant flows through the ducts 18 is increased or decreased by positioning, the locking ring sections the flow through the ducts 17 is correspondingly regulated in an inverse manner. When the flow through the ducts 18 is reduced the flow through the duct 17 increases so that the total cooling power in the neck portion of the thrust nozzle can be selectively regulated. Moreover, as vapor bubbles tend to form on the interior surface of the ducts 17 they can be removed quickly by increasing the flow through these ducts, and the possibility of localized overheating is reduced or eliminated.

In the different embodiments gaskets 33 are provided between the convergent portion 1 and the neck portion 2 and between the neck portion 2 and the divergent portion 3, see FIGS. 1, 3, 4, and 6 for effecting a seal between these separable portions.

Figure 6:
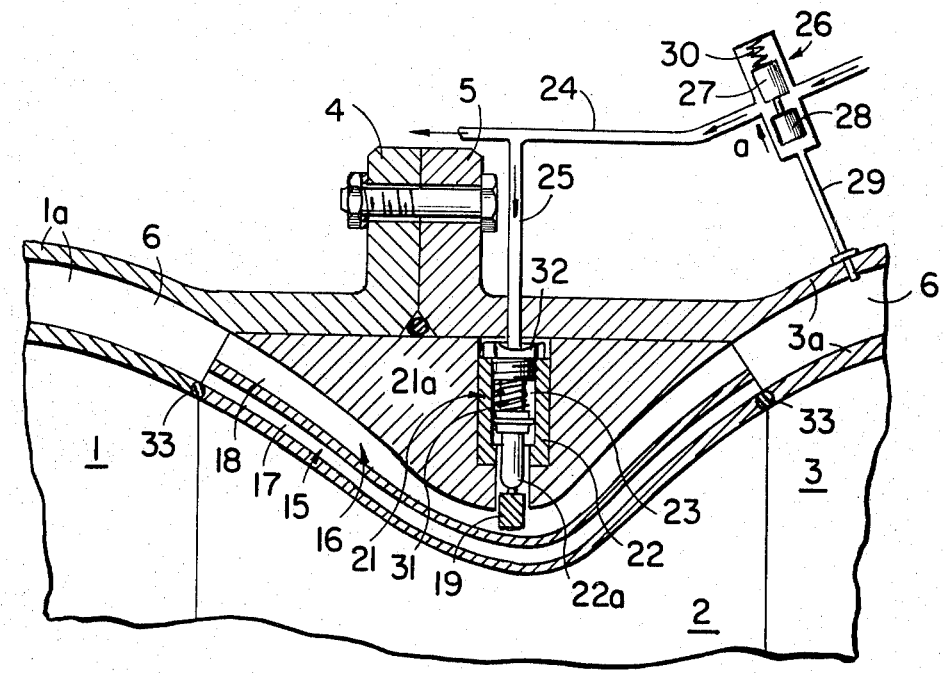
FIG. 6 is a partial longitudinal sectional view of a thrust nozzle having the same general form as the embodiment shown in FIG. 4, however, indicating alternate means for regulating flow through the ducts in the thrust nozzle.

In FIG. 6 a simplified arrangement is shown for automatically positioning the locking ring sections 19 within the ducts 18. The movement of the locking ring sections is effected in response to the pressure of the coolant, representing one of the propellant components for the liquid fueled rocket, which is proportional to the pressure and temperature conditions existing within the combustion chamber. Regulating devices 21 are provided within housing 21a located within the wall section of the neck portion 2 of the thrust nozzle. Each of the housings 21a contains a regulating piston 22 having an operating pin 22a depending downwardly from its lower surface into contact with the radially outer surface of one of the locking ring sections 19. The housings 21a form pressure chambers 23 for the regulating pistons 22 and are connected by a branch pressure line 25 to a working circuit 24. Upstream from the branch line 25 the working circuit contains a control device 26 which is comprised of a chamber containing a control piston 27 and a servo-piston 28. The portion of the chamber containing the servo-piston 28 is connected by means of a control line 29 to the duct 6 passing through the divergent portion 3 of the thrust nozzle. The control piston 27 is biased by means of an adjusting spring 30 into the path of the working circuit 24. As the outset a higher preliminary pressure is afforded the working fluid in the circuit 24 than the pressure of the propellant component flowing through the coolant duct 6. If the pressure in the coolant duct 6 affecting the control line 29 rises it causes a temperature and pressure increase within the combustion chamber and the thrust nozzle, the servo-piston 28 is directed outwardly in the direction of the arrow a and the control piston 27 moves in the same direction against the action of the spring 30 so that the cross section through the working circuit is increased. As a result, the pressure in the branch lines 25 and the chambers 23 is increased and the regulating pistons are moved radially inwardly and as a consequence, the locking rings are directed inwardly into the coolant ducts 18 limiting the effective flow cross section through the ducts. As the flow through the ducts 18 is reduced the flow through the ducts 17 is increased and the cooling power within the neck portion 2 is similarly increased. The regulating pistons 22 are reset by means of tension springs 31 which are rigidly connected to the regulating piston and to a plug 32 located in the radially outer part of the chambers 23.

It will be appreciated that within the scope of the invention it is possible to utilize the locking ring section arrangement shown in FIGS. 4, 5 and 6 in combination with the embodiment shown in FIG. 1 to regulate the quantitative distribution between the ducts 10 in the outer row and the ducts 9 in the inner row 7 in response to the temperature and pressure conditions existing within the combustion chamber and the thrust nozzle.

While for purposes of illustration the ducts extending between the divergent and convergent portions of the thrust nozzle are shown extending in a rectilinear fashion, it is also contemplated that the ducts may be arranged in a spiral pattern about the neck portion of the thrust nozzle.

What is claimed is:

1. In a rocket construction having a fluid cooled combustion chamber and comprising walls forming a longitudinally extending convergent-divergent thrust nozzle and having a neck portion at the juncture of the convergent-divergent portions thereof, a first row of cooling ducts forming the inner surface of said walls at the neck portion of said nozzle and extending longitudinally therefrom in both directions for at least a portion of the inner surfaces of the convergent and divergent portions of said nozzle, a second row of cooling ducts disposed radially outwardly from and concentrically about said first row of cooling ducts, said second row of ducts being longitudinally co-extensive with said first row of ducts, means for supplying coolant fluid into said first and second ducts for flow therethrough in indirect heat transfer relationship with the heated regions in the neck portion and adjacent convergent and divergent portions of said thrust nozzle, and flow control means disposed within said walls in the neck portion of said thrust nozzle and being movably positionable within said second row of cooling ducts for varying the cross-sectional flow area thereof and regulating the flow therethrough.

2. In a rocket construction, as set forth in claim 1, wherein said flow control means comprises a plurality of circumferentially extending locking ring sections disposed about and movably positionable in a radial direction within said second row of cooling ducts, and means for positioning said locking ring sections in place within said second row of cooling ducts.

3. In a rocket construction, as set forth in claim 2, wherein said means for positioning said locking ring sections comprises a plurality of screw bolts mounted within the walls forming the neck portion of said thrust nozzle and disposed in contracting relationship with said locking ring sections.

4. In a rocket construction as set forth in claim 2, wherein said means for positioning said locking ring sections comprises wall means forming a plurality of chambers disposed in said walls forming the necl neck of said thrust nozzle, a regulating piston disposed within each of said chambers and having a pin extending therefrom into engagement with the locking ring section, a pipe line connected to said chamber for supplying pressurized fluid thereto for operably positioning said piston and thereby movably positioning said locking ring sections within said second row of coolant ducts for regulating the flow of coolant through said ducts.

5. In a rocket construction as set forth in claim 4, wherein a piston-cylinder mechanism is disposed in said pipe line upstream from said chamber with the piston disposed in the path of flow through said pipe line, a branch pipe line communicating between said piston-cylinder mechanism and the flow of coolant fluid in the walls of said divergent section upstream from said first and second rows of cooling ducts whereby said piston is displaceable from the path of flow through said pipe line for regulating the supply of pressurized fluid admitted to said chambers containing said regulating pistons.

* * * * *